United States Patent
Hawes et al.

(10) Patent No.: US 10,479,357 B2
(45) Date of Patent: Nov. 19, 2019

(54) LANE KEEPING SYSTEM FOR AUTONOMOUS VEHICLE IN WIND CONDITIONS

(71) Applicant: APTIV TECHNOLOGIES LIMITED, St. Michael (BB)

(72) Inventors: Kevin J. Hawes, Greentown, IN (US); Ehsan Samiei, Kokomo, IN (US); Michael I. Chia, Cicero, IN (US)

(73) Assignee: APTIV TECHNOLOGIES LIMITED (BB)

( * ) Notice: Subject to any disclaimer, the term of this patent is extended or adjusted under 35 U.S.C. 154(b) by 312 days.

(21) Appl. No.: 15/161,502

(22) Filed: May 23, 2016

(65) Prior Publication Data

US 2017/0334444 A1    Nov. 23, 2017

(51) Int. Cl.
*B60W 10/20* (2006.01)
*B60W 10/22* (2006.01)
(Continued)

(52) U.S. Cl.
CPC ......... *B60W 30/12* (2013.01); *B60G 17/0165* (2013.01); *B60R 21/0136* (2013.01); *B60R 21/36* (2013.01); *B60W 10/20* (2013.01); *B60W 10/22* (2013.01); *B60W 40/02* (2013.01); *B62D 15/025* (2013.01); *G05D 1/0088* (2013.01); *G07C 5/00* (2013.01); *G08G 1/09626* (2013.01);
(Continued)

(58) Field of Classification Search
CPC ....................................................... B62D 6/08
See application file for complete search history.

(56) References Cited

U.S. PATENT DOCUMENTS

| 5,379,218 A | 1/1995 | Jacobi et al. |
| 8,170,788 B2 | 5/2012 | Sjogren et al. |

(Continued)

FOREIGN PATENT DOCUMENTS

| CN | 101466583 A | 6/2009 |
| CN | 103112452 A | 5/2013 |

(Continued)

OTHER PUBLICATIONS

C. Larish, D. Piyabongkarn, V. Tsourapas, R. Rajamani. "A New Predictive Lateral Load Transfer Ratio for Rollover Prevention Systems", IEEE Transactions on Vehicular Technology, vol. 62, No. 7, pp. 2928-2936, Sep. 2013.*

*Primary Examiner* — Anshul Sood
(74) *Attorney, Agent, or Firm* — Joseph V. Bonadies

(57) ABSTRACT

A lane keeping system includes an absolute pressure sensor located in a door on each of opposing sides of a vehicle. Each sensor generates a signal indicative of a door cavity pressure on that side of the vehicle. A safety restraint system (SRS) controller is in communication with the pressure sensor. The SRS controller is configured to determine a collision event in response to the signal (e.g., increased pressure in the door as it is crushed) and activate a safety restraint component in response to the determined collision event. A lane keeping system (LKS) controller is in communication with the pressure sensors. The LKS controller determines a lateral wind force on the vehicle in response to the signal from each pressure sensor. The LKS controller determines a correction in response to the determined lateral wind force to maintain the vehicle along a desired path.

19 Claims, 4 Drawing Sheets

(51) Int. Cl.
  *B60W 30/12* (2006.01)
  *B60G 17/0165* (2006.01)
  *B60R 21/0136* (2006.01)
  *B60R 21/36* (2011.01)
  *B62D 15/02* (2006.01)
  *G05D 1/00* (2006.01)
  *G08G 1/0962* (2006.01)
  *G08G 1/16* (2006.01)
  *G07C 5/00* (2006.01)
  *B60W 40/02* (2006.01)

(52) U.S. Cl.
  CPC ......... *G08G 1/167* (2013.01); *B60W 2520/10* (2013.01); *B60W 2550/12* (2013.01); *B60W 2710/207* (2013.01); *B60W 2710/223* (2013.01)

(56) References Cited

U.S. PATENT DOCUMENTS

| | | | |
|---|---|---|---|
| 9,132,835 B2 | 9/2015 | Yang et al. | |
| 9,545,911 B2 | 1/2017 | Kim | |
| 2014/0054880 A1* | 2/2014 | Feinstein | B60R 21/203 280/731 |
| 2015/0039183 A1 | 2/2015 | Yang et al. | |
| 2016/0096546 A1* | 4/2016 | Chia | B62D 6/08 701/41 |
| 2017/0010174 A1* | 1/2017 | Melen | B62D 15/025 |

FOREIGN PATENT DOCUMENTS

| | | |
|---|---|---|
| CN | 104118431 A | 10/2014 |
| DE | 10 2004 033731 A1 | 2/2006 |
| DE | 102004033731 A1 | 2/2006 |
| DE | 102008061909 A1 | 9/2009 |
| DE | 102008062752 A1 | 6/2010 |
| DE | 102010008079 A1 | 6/2011 |
| DE | 102012001649 A1 | 8/2013 |
| EP | 0927678 A1 | 7/1999 |
| WO | 2009/037026 A1 | 3/2009 |
| WO | 2014/155884 A1 | 10/2014 |

* cited by examiner

LANE KEEPING SYSTEM FOR AUTONOMOUS VEHICLE IN WIND CONDITIONS

BACKGROUND

This disclosure relates to a lane keeping system in a fully autonomous vehicle or a vehicle that is driver-assisted. The disclosed system maintains the vehicle in its lane when subjected to differential lateral forces, such as when the vehicle is buffeted by winds.

During abnormally windy conditions a vehicle is buffeted causing discomfort to the driver and occupants. Wind disturbances may be steady, gusty, or caused by wind shadowed areas or passing vehicles. In all cases the vehicle is buffeted due to lateral wind pressure onto the vehicle. Wind gusts can induce lateral forces from zero to hundreds of pounds in short bursts or by slowly changing conditions. In some circumstances, lane deflection of 10-20 cm have been observed due to wind gusts.

A typical automated lane keeping system uses a closed loop system to maintain vehicle position relative the lane while the vehicle is driven on a road. These systems have been improved upon by providing steering correction inputs due to wind forces, but they have been costly due to required additional components or have been difficult to implement.

SUMMARY

In one exemplary embodiment, a lane keeping system for a vehicle includes a pressure sensor configured to generate a signal indicative of a pressure. A safety restraint system (SRS) controller is in communication with the pressure sensor. The SRS controller is configured to determine a collision event in response to the signal and activate a safety restraint component in response to the determined collision event. A lane keeping system (LKS) controller is in communication with the pressure sensor. The LKS controller is configured to determine a lateral wind force on the vehicle in response to the signal. The LKS controller is configured to determine a correction in response to the determined lateral wind force to maintain the vehicle along a desired path.

In a further embodiment of any of the above, a vehicle body that includes an exterior body panel that at least partially defines an enclosed cavity. The pressure sensor is arranged in the enclosed cavity. The exterior body panel includes an opening that is in fluid communication with the enclosed cavity.

In a further embodiment of any of the above, the vehicle body includes a door that provides the exterior body panel and the enclosed cavity.

In a further embodiment of any of the above, a body molding is mounted to the exterior body panel over the opening. The body molding includes an aperture that is in fluid communication with the opening.

In a further embodiment of any of the above, the safety restraint component includes an airbag.

In a further embodiment of any of the above, the pressure sensor is an absolute pressure sensor. The vehicle includes opposing lateral sides. One of the pressure sensor is arranged on each of the opposing lateral sides.

In a further embodiment of any of the above, a differential pressure is measured from the absolute pressure sensors. The lateral wind force is determined based upon a product of the differential pressure and an area of a lateral side of the vehicle. The correction is a function of the lateral wind force, a vehicle speed, a steering ratio, a tire coefficient, and a suspension coefficient.

In a further embodiment of any of the above, a steering system is in communication with the LKS controller. The LKS controller is configured to add a wind compensation value to a commanded steering angle to maintain the vehicle along a desired path and counteract the determined wind force.

In a further embodiment of any of the above, a suspension system is in communication with the LKS controller. The LKS controller is configured to add a wind compensation value to a desired suspension stiffness to maintain the vehicle along a desired path and counteract the determined wind force.

In a further embodiment of any of the above, the SRS controller includes a filter that is configured to condition the signal and remove effects of noise due to wind.

In another exemplary embodiment, a lane keeping system for a vehicle includes first and second absolute pressure sensors configured to respectively generate first and second signals indicative of first and second pressures. A lane keeping system (LKS) controller is in communication with the first and second pressure sensors. The LKS controller is configured to determine a lateral wind force on the vehicle in response to a difference between the first and second signals. The LKS controller is configured to determine a correction in response to the determined lateral wind force to maintain the vehicle along a desired path.

In a further embodiment of any of the above, a vehicle body includes first and second door panels that each at least partially define an enclosed cavity. The first pressure sensor is arranged in the enclosed cavity of the first door panel on one side of the vehicle. The second pressure sensor is arranged in the enclosed cavity of the second door panel on another side of the vehicle.

In a further embodiment of any of the above, each of the first and second door panels includes an opening in fluid communication with its enclosed cavity.

In a further embodiment of any of the above, a body molding is mounted to each door panel over its respective opening. The body molding includes an aperture that is in fluid communication with its respective opening.

In a further embodiment of any of the above, a differential pressure is measured from the first and second signals. The lateral wind force is determined based upon a product of the differential pressure and an area of a lateral side of the vehicle. The correction is a function of the lateral wind force, a vehicle speed, a steering ratio, a tire coefficient, and a suspension coefficient.

In a further embodiment of any of the above, a steering system is in communication with the LKS controller. The LKS controller is configured to add a wind compensation value to a commanded steering angle to maintain the vehicle along a desired path and counteract the determined wind force.

In a further embodiment of any of the above, a suspension system is in communication with the LKS controller. The LKS controller is configured to add a wind compensation value to a desired suspension stiffness to maintain the vehicle along a desired path and counteract the determined wind force.

In another exemplary embodiment, a method of maintaining a vehicle along a desired path includes the step of determining a differential pressure using first and second absolute pressure sensors. A correction is determined from the pressure differential. A wind compensation value is added to at least one of a commanded steering angle and a desired suspension stiffness based upon the correction.

In a further embodiment of any of the above, the first and second absolute pressure sensors are respectively arranged within first and second door cavities arranged on opposite lateral sides of the vehicle.

In a further embodiment of any of the above, the correction is a function of the lateral wind force, a vehicle speed, a steering ratio, a tire coefficient, and a suspension coefficient.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

With the introduction of partially or fully automated vehicle control, the capability exists for enhanced vehicle control and safety using lateral force sensing. By using lateral force sensing, the vehicle path can proactively adjust to lateral disturbances rather than simply reacting after the lateral force has drifted the vehicle off course. Wind correction data is available instantaneously as opposed to a reactionary system, which for an autonomous system, may be hundreds of milliseconds delay. According to the disclosed system and method, lateral vehicle force due to wind is measured by the vehicle outside pressure applied to the vehicle exterior using existing pressure sensors that are used to detect a lateral collision, which reduces the cost associated with providing this functionality.

The disclosed system and method improves vehicle comfort by using pressure sensors and a control system that measures the lateral force to the vehicle and makes corrections to the steering angle and/or suspension before the vehicle drifts off course. The lateral wind detection can be used to reduce user-provided wind steering counter-torque in modern manual torque assist steering systems, for example, as part of a lane keeping system or an autonomously operated vehicle.

Figure 1:
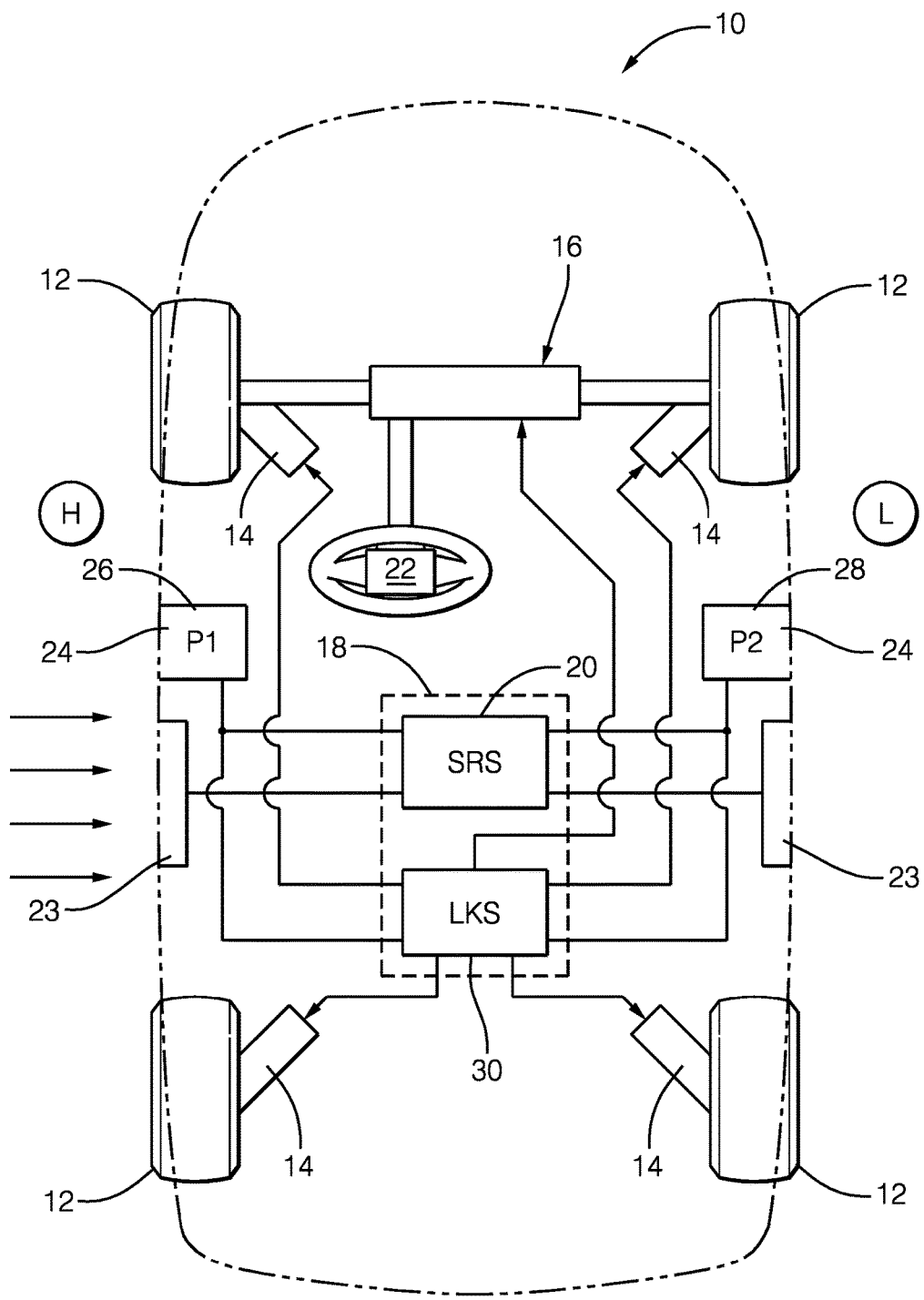
FIG. 1 is a schematic view of a vehicle with a lane keeping system and a safety restraint system.

Referring to FIG. 1, a vehicle 10 is shown in a highly schematic manner. The vehicle 10 includes wheels 12 supported by a suspension 14, which may be any suitable suspension configuration. In one example, the suspension 14, which can include hydraulic, pneumatic and/or mechanical damping and spring elements, is of the type that can be actively stiffened or softened during vehicle operation or provide a change in ride height. A torque assist steering system 16 is shown that is configured to steer the front wheels 12, but all-wheel or rear-wheel steering may provided instead, if desired. It should be understood that the vehicle 10 may be any type of vehicle with any suitable configuration.

A lateral wind force (horizontal arrows) acts on a side of the vehicle 10, which creates a high pressure H relative to a pressure L on the other side of the vehicle 10. This lateral wind force, if sufficiently large, may require the operator to provide a corrective steering input to the steering system 16 to main the vehicle 10 along a desired path. In the case of lane keeping system or an autonomous vehicle, the lateral wind force may require the steering system 16 to provide a steering angle correction, without any input from the vehicle operator.

A controller 18 includes a safety restraint system (SRS) controller 20 and a lane keeping system (LKS) controller 30. The controller 18 can be a single processor, or may comprise multiple processors distributed in the vehicle 10.

The SRS controller 20 is in communication with, for example, an airbag 22 in a steering wheel and side impact airbags 23. Of course, other safety restraint component components may also be in communication with the SRS controller 20, such as other airbags and seat belt tensioners.

First and second absolute pressure sensors 26, 28 are arranged within doors 24 and are in communication with the SRS controller 20. During a side impact, the door is crushed, which raises the pressure within the door. One such system is described in U.S. Pat. No. 7,568,393, entitled "AIR-PRESSURE SENSOR FOR SIDE-IMPACT DETECTION," which is incorporated herein by reference in its entirety. The SRS controller 20 determines whether there is a collision event in response to the pressure signal and activates the safety restraint components in response to the determined collision event. In one example system using pressure sensors to detect a side impact, a typical pressure rise for a valid crash is about 15 kPa in 8 ms. Abuse events where airbag deployment is undesirable, for example, a shopping cart hitting the door, are less than 5 kPa.

The LKS controller 30 is also in communication with the same first and second absolute pressure sensors 26, 28 as the SRS controller 20. Since these pressure sensors are located in a door on each of the opposing sides of the vehicle, these pressure sensors also can be used to detect the lateral wind forces on the vehicle if the pressure sensors are exposed to the pressures outside of the vehicle.

Figure 3B:
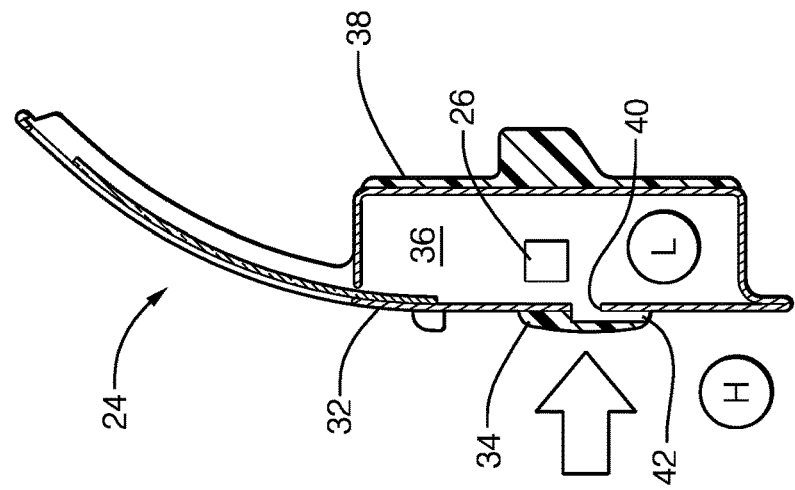
FIG. 3B is a cross-sectional view of the door shown in FIG. 3A.
Figure 3A:
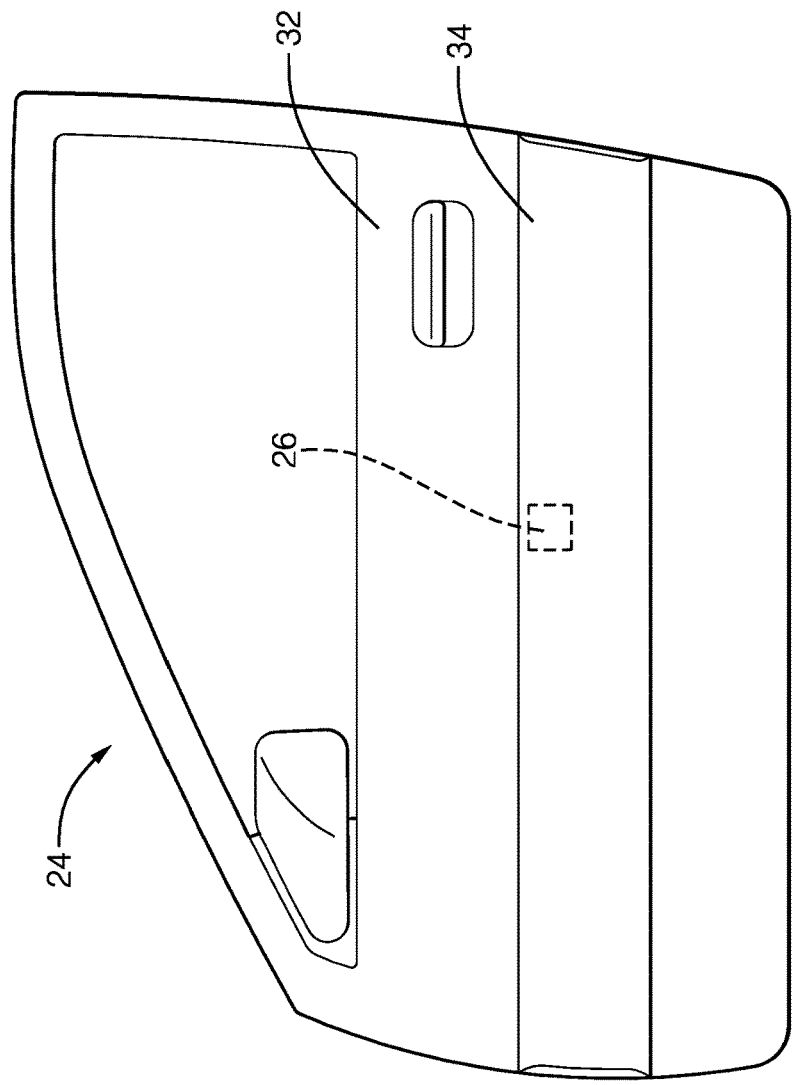
FIG. 3A is a schematic side view of a door with a pressure sensor.

Referring to FIGS. 3A and 3B, an example door 24 is shown in more detail. The door 24 has an exterior body panel 32 on which wind exerts forces that can move the vehicle from the desired path. The pressure sensor 26, for example, is arranged within a cavity 36 that is substantially enclosed by a trim panel 38, for example. An opening 40 is provided in the exterior body panel 32, and a body molding 34 is arranged over the opening 40 to act as a splash shield and prevent water and debris from entering the cavity 36. An aperture 42 is provided in the body molding 34 so that pressures in the environment on the side of the vehicle 10 are communicated to the pressure sensor 26 within the cavity 36.

Each pressure sensor generates a signal indicative of a door cavity pressure on that side of the vehicle. In four-door vehicles, it is desirable to use the pressure sensors in the front doors, since the wind effect on steering is greater at the front axle than the rear axle as the rotational moment is about the rear axle. Under calm conditions, the cavity 36 is at a pressure L. When wind blows at the side of the vehicle 10, an increased pressure H is detected by the pressure sensor 26 within the cavity 36. In one example, lateral wind gusts of 11 mph would produce a sensed pressure increase of about 0.02 kPa, which is well within the range of abuse event levels. The LKS controller 30 determines a lateral wind force on the vehicle 10 in response to the signal from each pressure sensor. The LKS controller 30 determines a correction in response to the determined lateral wind force to maintain the vehicle along the desired path.

Figure 2:
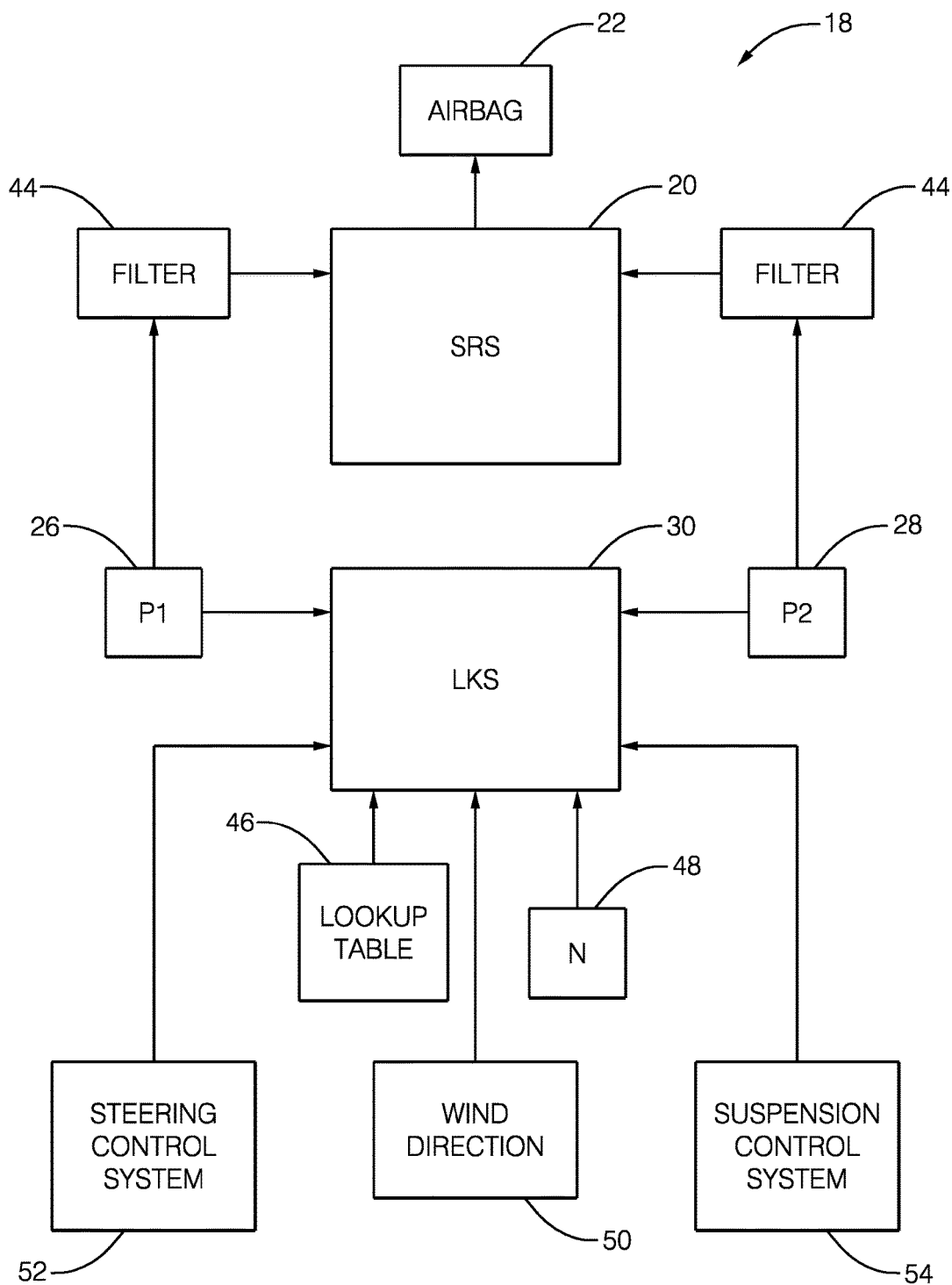
FIG. 2 is a schematic view of the lane keeping system and the safety restraint system shown in FIG. 1 using pressure sensors that are in common with both systems.

Referring to FIG. 2, the SRS controller 20 discerns a collision event from increased pressures due to wind by applying a filter 44 to condition the pressure sensor signals from the first and second pressure sensors 26, 28 and remove effects of "noise" due to wind. It is expected that the small opening 40 added to the exterior body panel 32 will have little effect on the side impact sensing function. In fact, this unique arrangement of the body molding 34 will close off of the door cavity 36 as the body molding 34 is crushed on the exterior body panel 32. One possible benefit of this opening/body molding arrangement is the oncoming vehicle will have a pressure wave front which will raise the interior door cavity pressure before actual collision occurs. This could result in an improvement in performance of the side impact pressure system.

The LKS controller 30 commands a steering control system 52 in communication with the steering system 16 and/or commands a suspension control system in communication with the suspension 14 to maintain the desired vehicle path. In the case of the steering control system 52, the LKS controller 30 is configured to add a wind compensation value to a commanded steering angle to maintain the vehicle along the desired path and counteract the determined wind force. In the case of the suspension control system 54, the LKS controller 30 is configured to add the wind compensation value to a desired suspension stiffness, including raising or lowering one side of the vehicle relative to the other, to maintain the vehicle along a desired path and counteract the determined wind force.

Vehicle speed (N) 48, wind direction 50 and other variables may be used by the LKS controller 30 in addition to the pressure signals to determine the wind compensation value. Wind direction can be determined by one or more differential pressure sensors, which may be located on an upper portion of the vehicle body, such as the hood, roof or trunk lid. Other variables may include a steering ratio (STEERING$_{ratio}$), a tire coefficient ($C_{tire}$), and a suspension coefficient ($C_{suspension}$), and/or other vehicle dynamic characteristics. These variables may be provided to the LKS controller 30 as part of a look-up table 46.

Figure 4:
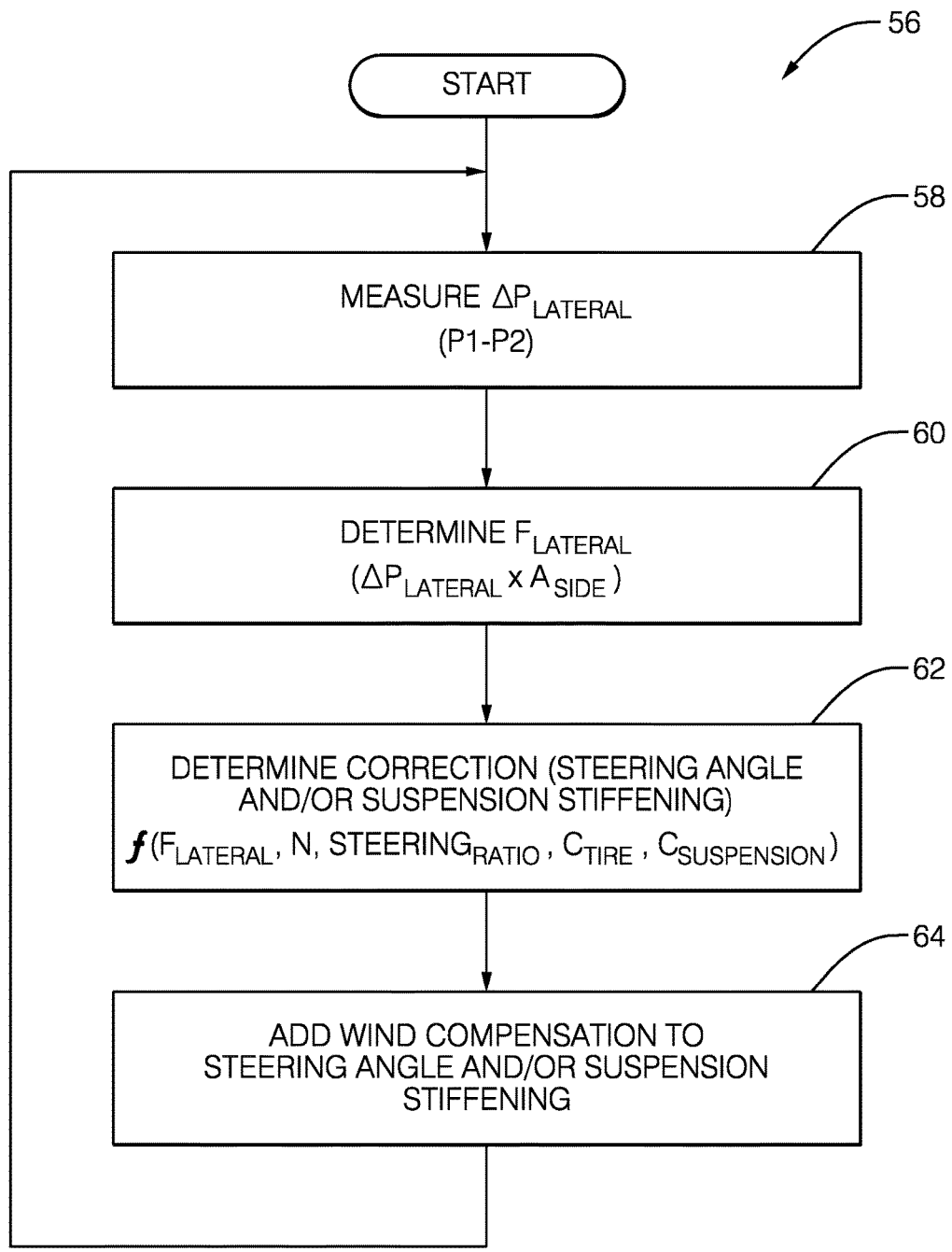
FIG. 4 is a flowchart depicting a method of lane keeping using the systems shown in FIGS. 1-2.

An example method 56 of lane keeping is shown in FIG. 4. A differential pressure $\Delta P_{lateral}$ is measured as a difference of the absolute pressure sensors (P1–P2), which is indicative of a wind force on the vehicle 10 (block 58). The lateral wind force $F_{lateral}$ is determined based upon a product of the differential pressure $\Delta P_{lateral}$ and an area of a lateral side of the vehicle $A_{side}$, which is stored in a controller memory for the particular vehicle (block 60). The correction needed to maintain the vehicle along the desired path is a function of the lateral wind force $F_{lateral}$, a vehicle speed N, a steering ratio STEERING$_{ratio}$, a tire coefficient $C_{tire}$, and a suspension coefficient $C_{suspension}$ (block 62). Additional or different vehicle dynamic characteristics may be used, if desired. A wind compensation value is added to at least one of a commanded steering angle and a desired suspension stiffness based upon the correction (block 64).

The disclosed lane keeping system and method provides a low cost approach to proactively compensate for undesired wind forces on the vehicle that might cause the vehicle to deviate from the desired path.

The disclosed controller 18 may include a processor and non-transitory memory where computer readable code for controlling operation is stored. In terms of hardware architecture, such a controller can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller 18 may be a hardware device for executing software, particularly software stored in memory. The processor can be a custom made or commercially available processor, a central processing unit (CPU), an auxiliary processor among several processors associated with the controller, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, etc.). Moreover, the memory may incorporate electronic, magnetic, optical, and/or other types of storage media. The memory can also have a distributed architecture, where various components are situated remotely from one another, but can be accessed by the controller.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The input/output devices that may be coupled to system I/O Interface(s) may include input devices, for example, but not limited to, a scanner, microphone, camera, proximity device, etc. Further, the input/output devices may also include output devices, for example but not limited to a display, etc. Finally, the input/output devices may further include devices that communicate both as inputs and outputs, for instance but not limited to, a modulator/demodulator (for accessing another device, system, or network), a radio frequency (RF) or other transceiver, a bridge, a router, etc.

When the controller 18 is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A lane keeping system for a vehicle comprising:
   a pressure sensor configured to generate a signal indicative of a pressure;
   a safety restraint system (SRS) controller in communication with the pressure sensor, the SRS controller configured to determine a collision event in response to the signal and activate a safety restraint component in response to the determined collision event; and
   a lane keeping system (LKS) controller in communication with the pressure sensor, the LKS controller configured to determine a lateral wind force on the vehicle in response to the signal, the LKS controller configured to determine a correction in response to the determined lateral wind force to maintain the vehicle along a desired path.

2. The system according to claim 1, comprising a vehicle body that includes an exterior body panel that at least partially defines an enclosed cavity, the pressure sensor is arranged in the enclosed cavity, and the exterior body panel includes an opening in fluid communication with the enclosed cavity.

3. The system according to claim 2, wherein the vehicle body includes a door that provides the exterior body panel and the enclosed cavity.

4. The system according to claim 2, comprising a body molding mounted to the exterior body panel over the opening, the body molding includes an aperture in fluid communication with the opening.

5. The system according to claim 1, wherein the safety restraint component includes an airbag.

6. The system according to claim 1, wherein the pressure sensor is an absolute pressure sensor, the vehicle includes opposing lateral sides, and one of the pressure sensor is arranged on each of the opposing lateral sides.

7. The system according to claim 6, wherein a differential pressure is measured from the absolute pressure sensors, and the lateral wind force is determined based upon a product of the differential pressure and an area of a lateral side of the vehicle, wherein the correction is a function of the lateral wind force, a vehicle speed, a steering ratio, a tire coefficient, and a suspension coefficient.

8. The system according to claim 1, comprising a steering system in communication with the LKS controller, the LKS controller configured to add a wind compensation value to a commanded steering angle to maintain the vehicle along a desired path and counteract the determined wind force.

9. The system according to claim 1, comprising a suspension system in communication with the LKS controller, the LKS controller configured to add a wind compensation value to a desired suspension stiffness to maintain the vehicle along a desired path and counteract the determined wind force.

10. The system according to claim 1, wherein the SRS controller includes a filter configured to condition the signal and remove effects of noise due to wind.

11. A lane keeping system for a vehicle comprising:
    a vehicle body having a first door panel on one side of the vehicle body and a second door panel on another side of the vehicle body;
    first and second absolute pressure sensors configured to respectively generate first and second signals indicative of first and second pressures, the first absolute pressure sensor located in the first door panel and the second absolute pressure sensor located in the second door panel; and
    a lane keeping system (LKS) controller in communication with the first and second absolute pressure sensors, the LKS controller configured to determine a lateral wind force on the vehicle in response to a difference between the first and second signals, the LKS controller configured to determine a correction in response to the determined lateral wind force to maintain the vehicle along a desired path.

12. The system according to claim 11, wherein the first and second door panels each at least partially define an enclosed cavity, the first absolute pressure sensor is arranged in the enclosed cavity of the first door panel, and the second absolute pressure sensor is arranged in the enclosed cavity of the second door panel.

13. The system according to claim 12, wherein each of the first and second door panels includes an opening in fluid communication with its enclosed cavity.

14. The system according to claim 13, comprising a body molding mounted to each door panel over its respective opening, the body molding includes an aperture in fluid communication with its respective opening.

15. The system according to claim 11, wherein a differential pressure is measured from the first and second signals, and the lateral wind force is determined based upon a product of the differential pressure and an area of a lateral side of the vehicle, wherein the correction is a function of the lateral wind force, a vehicle speed, a steering ratio, a tire coefficient, and a suspension coefficient.

16. The system according to claim 11, comprising a steering system in communication with the LKS controller, the LKS controller configured to add a wind compensation value to a commanded steering angle to maintain the vehicle along a desired path and counteract the determined wind force.

17. The system according to claim 11, comprising a suspension system in communication with the LKS controller, the LKS controller configured to add a wind compensation value to a desired suspension stiffness to maintain the vehicle along a desired path and counteract the determined wind force.

18. A method of maintaining a vehicle along a desired path comprising the steps of:
    determining a differential pressure using first and second absolute pressure sensors, wherein the first and second absolute pressure sensors are respectively arranged within first and second door cavities arranged on opposite lateral sides of the vehicle;
    determining a correction from the pressure differential; and
    adding a wind compensation value to at least one of a commanded steering angle and a desired suspension stiffness based upon the correction.

19. The method according to claim 18, wherein the correction is a function of the lateral wind force, a vehicle speed, a steering ratio, a tire coefficient, and a suspension coefficient.

\* \* \* \* \*